United States Patent
Miller et al.

(10) Patent No.: US 6,291,970 B1
(45) Date of Patent: Sep. 18, 2001

(54) DEVICE FOR REVERSE POLARIZATION PROTECTION FOR A BATTERY

(75) Inventors: Larry F. Miller, Los Gatos; Shandon G. Alderson, Fremont, both of CA (US)

(73) Assignee: Zircon Corporation, Campbell, CA (US)

( * ) Notice: Subject to any disclaimer, the term of this patent is extended or adjusted under 35 U.S.C. 154(b) by 0 days.

(21) Appl. No.: 09/637,268

(22) Filed: Aug. 10, 2000

(51) Int. Cl.[7] .......................... H01M 10/44; H01M 10/46
(52) U.S. Cl. .............................. 320/112; 320/165; 429/1
(58) Field of Search ..................................... 320/107, 112, 320/165; 429/1, 96, 98

(56) References Cited

U.S. PATENT DOCUMENTS

| | | |
|---|---|---|
| 4,084,037 * | 4/1978 | Morton . |
| 4,595,641 * | 6/1986 | Giurtino . |
| 4,972,135 * | 11/1990 | Bates et al. . |
| 5,229,220 * | 7/1993 | Stanton et al. . |
| 5,376,476 | 12/1994 | Eylon ........................................ 429/1 |
| 5,906,505 | 5/1999 | McCurdy, Jr. et al. ............. 439/500 |

\* cited by examiner

Primary Examiner—Edward H. Tso
(74) Attorney, Agent, or Firm—Skjerven Morrill MacPherson LLP; Norman R. Klivans

(57) ABSTRACT

A device providing reverse polarization protection for a battery having both positive and negative terminals disposed at one end of the battery (e.g., a 9 volt "transistor radio" battery). The device is adapted for insertion between the battery terminals and the spring contacts in a battery housing. The device is made from an electrically insulating material (e.g., plastic), and has at least two openings of unequal size defined through it. The first opening has a diameter larger than that of a negative terminal of the battery, while the second opening has a diameter larger than that of a positive terminal of the battery. The second opening is sized such that the negative terminal of the battery cannot pass through it, thus providing the required mechanical interference for reverse polarity protection. The thickness of the device is less than the height of the battery terminals. The device is capable of moving freely along the axis defined by the length of the battery in conjunction with spring contact compression/decompression, while being retained within the battery housing. Since the device is thereby able to move, or "float", the product's spring contacts may be the only compliant components.

13 Claims, 3 Drawing Sheets

DEVICE FOR REVERSE POLARIZATION PROTECTION FOR A BATTERY

FIELD OF THE INVENTION

The present disclosure relates generally to protection of electrical batteries and more particularly to preventing such batteries from making electrical connection when installed in the reversed polarity condition.

BACKGROUND

The standard rectangular shaped 9 volt "transistor radio" battery is used in a wide variety of products (e.g., portable radios, smoke detectors, cameras). In this battery type, the positive and negative terminals are at one end of the battery. To prevent damage to the product, it is often necessary to prevent the battery terminals from improperly electrically connecting with the electrical contacts of the product in which the battery is installed. The battery terminals themselves are configured to facilitate this, in that one terminal is adapted to be a "male" connector and the other terminal is adapted to be a "female" connector, each also having a different diameter. When the device is electrically connected to the battery via a mating cable connector, proper battery polarization is automatically achieved, because per its description, it has two connectors, each of which "mate", or mechanically cooperate, only with one of the male and female connectors on the battery.

However, because product manufacturer may find it more convenient to install batteries in a product without the use of a mating cable connector, and because it is often easier and less expensive to manufacture a product without a mating cable connector, in many applications it is preferable to make a pressure contact against the terminals of the battery with a spring mechanism of some type, rather than using a mating cable connector. In these applications, protecting the product from reverse polarization when incorrectly installed requires some form of mechanical interference. However, due to variation in the lengths of different brands of batteries and tolerance variations within a brand, there is a need for a reverse polarization protection method that compensates for different battery lengths.

SUMMARY

A device providing reverse polarization protection for a battery having both positive and negative terminals disposed at one end of the battery (e.g., a 9 volt "transistor radio" battery) is described. The device is adapted for insertion between the terminals of such a battery and conventional battery spring contacts in a battery housing. The device is mostly planar and made from an insulating material (e.g., plastic), and has two openings of unequal size defined through it. The first opening has a diameter to accommodate a negative terminal of the battery, while the second opening has a diameter slightly larger than that of a positive terminal of the battery. The second opening is sized such that the (larger) negative terminal of the battery cannot pass through it, thus providing the mechanical interference for reverse polarity protection.

The device in one embodiment moves freely in conjunction with spring contact compression/decompression, while being retained within the battery housing of the product. Since the device is able to move, or "float", it is possible for the product's battery spring contacts, which are present anyway, to be the only compliant components in the design.

The present device is especially useful in low-cost applications where the battery housing is made from plastic, since the device can be fabricated from the same mold as the battery housing at little additional cost. The device is also useful in applications where use of a mating cable connector for providing battery reverse polarization protection is not desirable. The device is not limited to use with the standard 9 volt type batteries.

DETAILED DESCRIPTION

Figure 1:
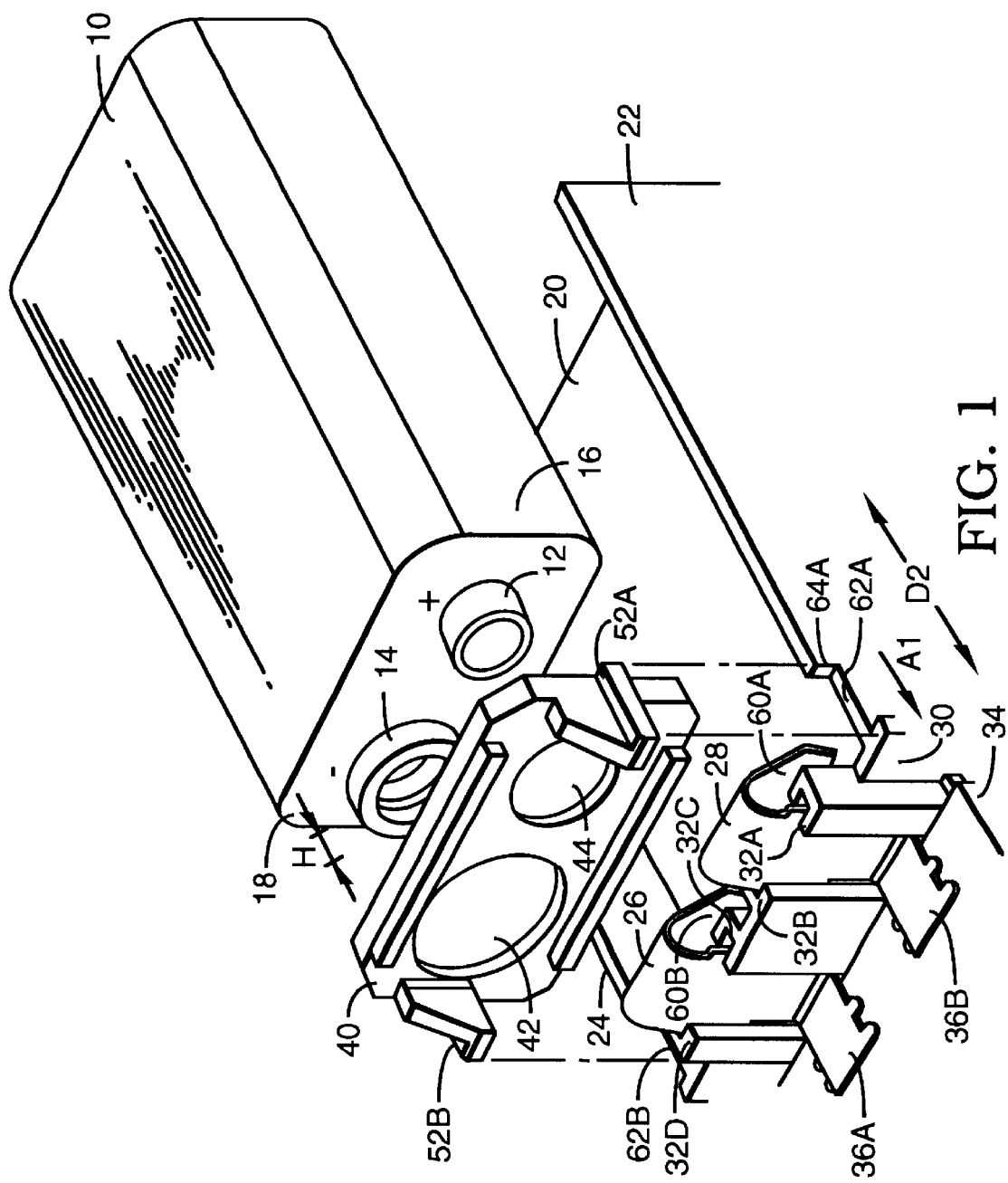
FIG. 1 is an exploded perspective view of a portion of a housing for a battery, in combination with its spring contacts, a battery, and the present device.

As illustrated in FIG. 1, a battery 10 includes a positive terminal 12 and a negative terminal 14 disposed at one end 16 of battery 10. Battery 10 is, for example, a standard 9 volt "transistor radio" battery. Positive terminal 12 and negative terminal 14 extend substantially parallel to a front face 18 of battery 10. Positive terminal 12 of battery 10 has, e.g., a nominal diameter ranging from 0.21 inches (5.3 mm) to 0.23 inches (5.8 mm). Negative terminal 14 of battery 10 has, e.g., a nominal diameter ranging from 0.32 inches (8.1 mm) to 0.34 inches (8.6 mm). Battery 10 is inserted into a lower portion 20 of a mostly conventional battery housing, partly guided by sidewalls 22 and 24 of lower portion 20 of the battery housing. (For clarity of presentation, the mostly conventional upper portion of the battery housing is not shown). It is to be understood that the upper portion of the housing is disposed substantially parallel with lower portion 20 of the housing, and cooperates with the lower portion 20 to enclose battery 10.

The FIG. 1 embodiment is merely one implementation of how the present reverse polarization protection device 40 is freely movable, being slidable between the terminals of battery 10 and the spring contacts 26, 28, while being retained within the battery housing. In this embodiment, sidewalls 22 and 24 of the lower portion 20 of the housing define a notch therein proximate spring contacts 26, 28, providing guide surfaces 62A, 62B. The upper portion of housing 20 also includes guide surfaces opposite guide surfaces 62A and 62B, essentially forming a groove within housing 20 along which device 40 may travel. The notches defined in sidewalls 22 and 24 of lower portion 20 further provide stops 64A, 64B (though 64B is not shown because it is not visible in this drawing; it is blocked from view by spring contact 26). Stops 64A, 64B limit the travel of device 40 in the direction away from the spring contacts and toward the terminals 12, 14 of battery 10, as discussed in greater detail below. Those of ordinary skill in the art will understand that modifications can be made to this embodiment, while still permitting device 40 to be freely movable.

Attached to housing 20 are battery spring contacts, including a first spring contact 26 for making an electrical contact to positive terminal 12 of battery 10, and a second spring contact 28 for electrical contact to negative terminal 14 of battery 10. First spring contact 26 and second spring contact 28 are disposed substantially in parallel with one another, and in this embodiment, are coplanar with front face 30 of lower portion 20 of the housing. In the FIG. 1 embodiment, first spring contact 26 and second spring contact 28 are metallic spring members. First spring contact 26 and second spring contact 28 may be retained in position within the lower portion 20 of the housing by, for example, channels 32A, 32B, 32C, and 32D, which are extending from and integral with front face 30 of housing 20. First spring contact 26 and second spring contact 28 may be, for example, conductive coiled springs, retained in position within lower portion 20 of the housing by insertion into protuberances which are integral with and extending from front face 30 of housing 20. Typical materials for first spring contact 26 and second spring contact 28 (which are conventional) include steel, beryllium-copper and brass.

First spring contact 26 and second spring contact 28 are electrically connected to a product 34 which may be, for example, a printed circuit board (PCB) by means of, for example, conductive tabs 36A, 36B extending therefrom. Though first spring contact 26 and second spring contact 28 as shown here resemble an inverted "J" in shape, first spring contact 26 and second spring contact 28 may be of many different shapes and orientations, so long as positive terminal 12 and negative terminal 14 of battery 10 are capable of making an electrical connection with first spring contact 26 and second spring contact 28 by passing through device 40.

At least one of first spring contact 26 and second spring contact 28 are larger in surface area than corresponding first opening 42 or second opening 44 of device 40. Otherwise, if either first spring contact 26 or second spring contact 28 penetrate through corresponding first opening 42 and second opening 44, they may make physical contact and thus an electrical connection with the terminals of battery 10, possible causing circuit damage to the product if battery 10 is not properly oriented with respect to spring contacts 26, 28.

Figure 2A:
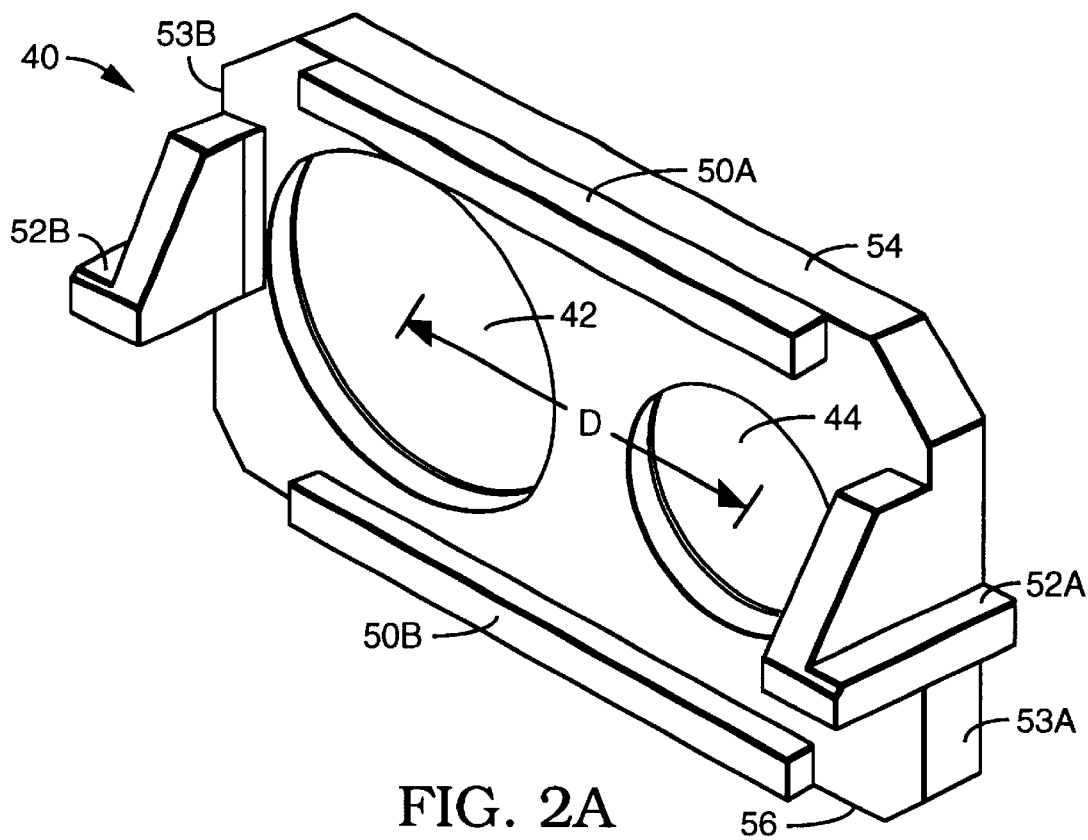
FIG. 2A is a perspective view of the present device, and in particular, depicting the surface of the device which faces away from the battery terminals.
Figure 2B:
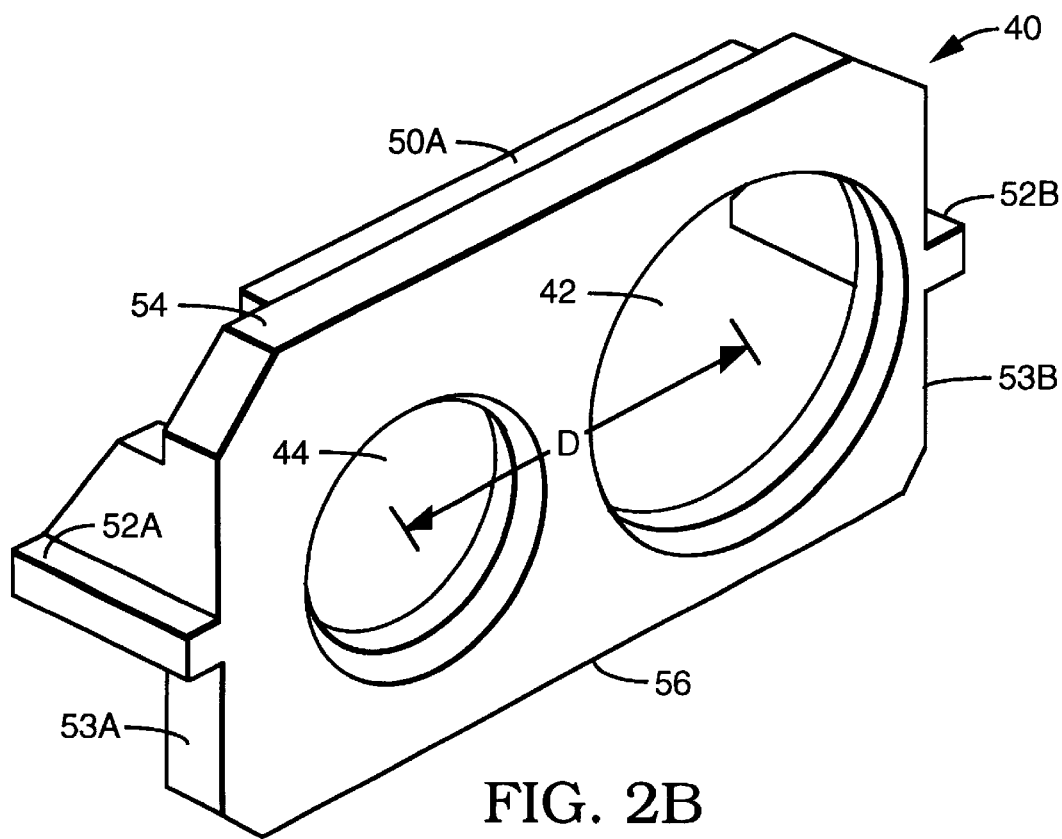
FIG. 2B is a perspective view of the present device, rotated 180 degrees from the view shown in FIG. 2A and in particular, depicting the surface of the device which faces toward the battery terminals.

FIG. 2A is a perspective view of device 40 in the same orientation as in FIG. 1, while FIG. 2B provides a perspective view of device 40, rotated 180 degrees from the FIG. 2A view. Device 40 provides reverse polarization protection for battery 10, and has two openings of unequal size defined therethrough. First opening 42 is sized to accommodate negative terminal 14 and in one embodiment has a diameter slightly larger than negative terminal 14, for example, between 0.37 inches (9.4 mm) and 0.38 inches (9.7 mm). Second opening 44 is sized to accommodate the positive terminal 12 and in one embodiment has a diameter slightly larger than positive terminal 12 of battery, for example, between 0.26 inches (6.6 mm) and 0.27 inches (6.9 mm). The second opening 44 is small enough such that negative terminal 14 of battery 10 is incapable of extending through it, thus providing the required mechanical interference for reverse polarity protection of battery 10.

It is to be understood that first opening 42 and second opening 44 need not be circular. First opening 42 and second opening 44 may be oval, square, rectangular or any other shape so long as they accommodate the terminals of battery 10, and differ in size such that the negative (larger) terminal 14 of battery 10 cannot pass through second opening 44 of device 40. The center of the first opening 42 is separated from the center of the second opening 44, by a distance "D", which is equal to the distance separating the center line of the negative terminal 14 from that of the positive terminal 12.

Device 40 optionally includes support ribs 50A and 50B, which provide additional rigidity to device 40. Device 40 may include a first retention surface 52A, and a second retention surface 52B. First retention surface 52A and second retention surface 52B extend transversely from first side edge 53A and second side edge 53B of device 40, respectively, and are configured to rest on guide surfaces 62A, 62B, respectively of lower portion 20 of the housing when device 40 is inserted therein.

Referring again to the FIG. 1 embodiment, retention surfaces 52A, 52B of device 40 rest on guide surfaces 62A, 62B of lower portion 20. Battery 10 is then correctly inserted within housing 20 as described below, so that battery terminals 12 and 14 of battery 10 extend through second opening 44 and first opening 42, respectively, of device 40. The upper portion (cover) of the battery housing (not shown) is then placed over battery 10 and device 40, the upper portion having sidewalls with guide surfaces opposite guide surfaces 62A, 62B. A groove is thereby formed, retention surfaces 52A, 52B of device 40 resting in that groove. When so positioned, device 40 is capable of movement in the direction indicated by arrow Al against first spring contact 26 and second spring contact 28 which are compressed when pushed upon by face 18 of battery 10. However, movement of device 40 in the opposite direction as the spring contacts decompress is limited by stops 64A, 64B of sidewalls 22, 24 of housing 20 (though stop 64B is not shown because it is not visible in the drawing; it is blocked from view by spring contact 26).

FIG. 1 is merely one implementation of how housing 20 accommodates device 40 as device 40 moves freely with compression/decompression of the spring contacts, while being retained in its nominal location within the battery housing of the product. Retention surfaces 52A, 52B are not essential, since other arrangements of device 40 within the housing are possible. In conjunction with the design of device 40, the design of the housing 20 dictates the travel guidance, travel limits, and retention of device 40. In one embodiment, the length of guide surface 62A, defined as the distance between stop 64A and front face 30 of lower portion 20 of the housing, is approximately 0.25 inches. Assuming device 40 has a thickness at its critical dimension of 0.10 inches, then device 40 may travel a distance of 0.15 inches. Advantageously, the permitted travel distance of 0.15 inches allows device 40 to a provide reverse polarization protection for many makes of 9 volt batteries, which the present inventors have observed to vary in length from 1.82 inches to 1.95 inches.

Figure 3A:
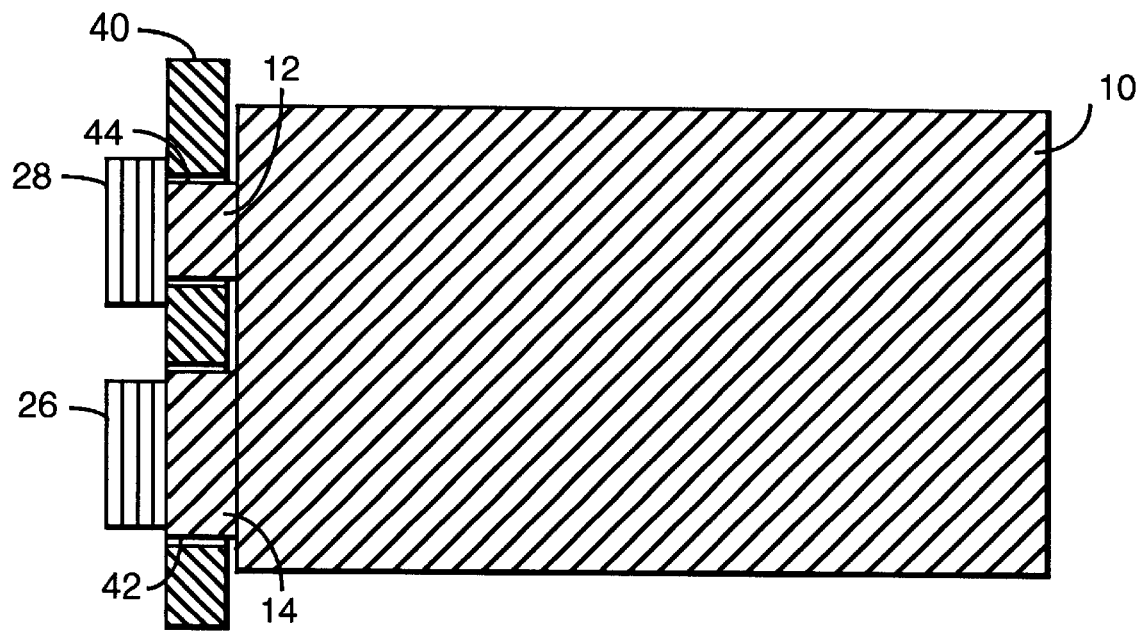
FIG. 3A is a top view of a battery when correctly installed with the present device.
Figure 3B:
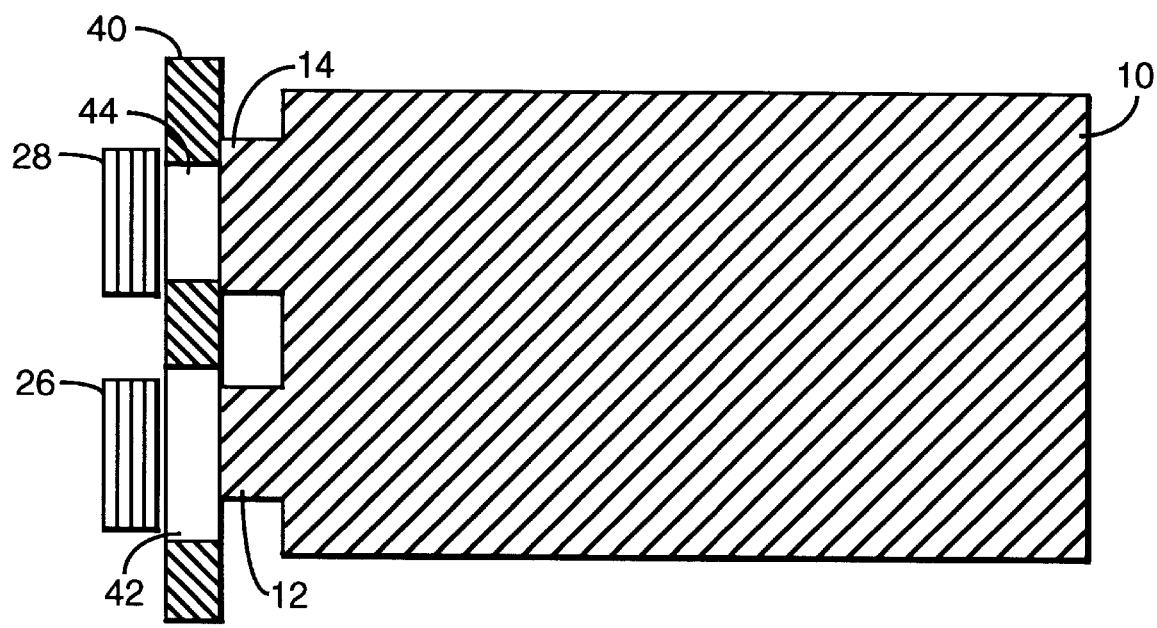
FIG. 3B is a top view of a battery when incorrectly installed with the present device.

FIGS. 3A and 3B are top views illustrating the combination of device 40 and battery 10. Referring to FIG. 3A, when battery 10 is correctly installed within housing 20, (smaller) positive terminal 12 of battery 10 passes through (smaller) second opening 44 of device 40, thereby permitting physical contact and an electrical connection between positive terminal 12 and first contact 28. Similarly, (larger) negative terminal 14 of battery 10 passes through (larger) first opening 42 of device 40, thereby permitting physical contact and an electrical connection between negative terminal 14 and second contact 26.

Conversely, when battery 10 is incorrectly installed within housing 20, as illustrated in FIG. 313, the larger negative terminal 14 cannot pass through smaller second opening 44 of device 40, thereby preventing physical contact and an electrical connection between negative terminal 14 and first contact 28. Since positive terminal 12 is approximately the same height as negative terminal 14, positive terminal 12 is likewise prevented from passing through (larger) first opening 42 of device 40, thereby also preventing physical contact and an electrical connection between positive terminal 12 and second contact 26.

The requirement that the relevant thickness of device 40 be less than the height of the terminals of battery 10 is based on the fact that, when correctly inserted, the terminals of battery 10 must be able to extend through device 40 and make physical contact with first contact 28 and second contact 26. Normally, at least one of first contact 28 and second contact 26 will not extend through second opening 44 or first opening 42. Accordingly, the terminals 12, 14 of battery 10 will need to extend through second opening 44 or first opening 42 to reach first spring contact 28 and second spring contact 26, and hence the height of terminals 12, 14 of battery 10 are greater than the thickness of device 40. Stated another way, the thickness of device 40 is less than the height of the terminals 12, 14 of battery 10. In one embodiment, the pertinent thickness of device 40 is 0.10 inches, while the nominal height of the battery terminals 12, 14 is 0.12 inches.

Advantageously, device 40 is not fixed in position within housing 20 with respect to the longitudinal axis of the battery 10. Instead, device 40 is capable of moving freely along that axis in conjunction with spring contact compression/decompression, while being retained within the battery housing of the product. Since device 40 is able to freely move, or "float" along this axis, in one embodiment the product's spring contacts are the only compliant components.

Device 40 is particularly advantageous when used in conjunction with products having housings 20 made from plastic. When device 40 is made from the same mold as housing 20, the additional expense associated with manufacturing housing 20 is so minimal it is virtually free. This is an especially significant advantage when the product itself is relatively low cost.

The presently disclosed embodiments are illustrative and not limiting; further modifications will be apparent to one skilled in the art in light of this disclosure and are intended to fall within the scope of the appended claims.

We claim:

1. A device for providing reverse polarization protection for a battery having first and second terminals disposed at one end thereof and adapted for insertion between said terminals of said battery and associated spring contacts in a housing for said battery, said device comprising:
   a member of insulating material defining at least two openings therethrough,
   the first opening having a size larger than that of a first terminal of said battery;
   the second opening having a size larger than that of a second terminal of said battery, wherein said first terminal of said battery does not pass therethrough;
   and further wherein a thickness of said member is less than the heights of said first and said second terminals.

2. The device of claim 1, wherein said insulating material is plastic.

3. The device of claim 1, wherein a dimension of said first opening ranges from approximately 0.37 inches to 0.38 inches, and said dimension of said second opening ranges from approximately 0.26 inches to 0.27 inches.

4. The device of claim 1, said member having a thickness of approximately 0.10 inches.

5. The device of claim 1, said member further comprising:
   a top edge, a bottom edge, a first side edge, and a second side edge, wherein a first retention surface is integrally formed with said first side edge, said retention surface extending transversely from said first side edge; and
   a second retention surface integrally formed with said second side edge, said retention surface extending transversely from said second side edge.

6. A combination for use with a battery having a first terminal and a second terminal disposed at one end thereof comprising:
   a housing into which said battery may be inserted, including:
      a first spring contact for electrical connection with said first terminal of said battery; and
      a second spring contact for electrical connection with said second terminal of said battery, said first spring contact and said second spring contact being disposed alongside one another within said housing;
   a member for providing reverse polarization protection for said battery, said member being of an electrically insulating material, defining at least two openings therethrough,
      the first opening having a size larger than that of the first terminal of said battery; and
      the second opening having a size larger than that of the second terminal of said battery, wherein said first terminal of said battery cannot pass therethrough; and
   wherein a thickness of said member is less than the heights of said first and said second terminals.

7. The combination of claim 6, wherein said housing and said device are of plastic.

8. A combination of claim 6, wherein a dimension of said first opening ranges from approximately 0.37 inches to 0.38 inches, and said dimension of said second opening ranges from approximately 0.26 inches to 0.27 inches.

9. The combination of claim 6, wherein:
   said housing further comprises a lower portion having two sidewalls, each sidewall having a notch defined therein proximate said first spring contact and said spring second contact, each notch providing a guide surface and a stop;
   and wherein said member further comprises:
      a first retention surface integrally formed with said first side edge, said retention surface extending transversely from said first side edge; and
      a second retention surface integrally formed with a second side edge, said retention surface extending transversely from said second side edge;
   whereby said retention surfaces permit said member to move within said housing along said guide surfaces, while said battery is retained within said housing by said stops.

10. The combination of claim 6, wherein said spring contacts are coiled springs.

11. The combination of claim 6, wherein said spring contacts are spring members.

12. The combination of claim 6, wherein said spring contacts are selected from the group consisting of steel, beryllium-copper, and brass.

13. A method of mounting a battery in a housing, comprising the acts of:
   providing a mechanical interference wherein said battery is mounted in only one positive-negative terminal polarization within said housing; and
   allowing said mechanical interference to move along a longitudinal axis of said battery.

* * * * *